United States Patent Office 3,084,153
Patented Apr. 2, 1963

3,084,153
WATER-SOLUBLE MONOAZO BENZOTHIAZOLE DYESTUFFS
Brian Ribbons Fishwick and Eric Leslie Johnson, Manchester, England, assignors to Imperial Chemical Industries Limited, London, England, a corporation of Great Britain
No Drawing. Filed Oct. 28, 1959, Ser. No. 849,186
Claims priority, application Great Britain Nov. 3, 1958
3 Claims. (Cl. 260—158)

This invention relates to new azo dyestuffs and more particularly it relates to new water-insoluble azo dyestuffs which are valuable for the colouration of artificial textile materials.

According to the invention there are provided the new water-insoluble azo dyestuffs of the formula:

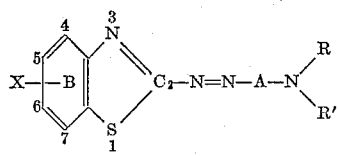

wherein A represents a substituted or unsubstituted 1:4-phenylene or 1:4-naphthylene nucleus which is free from sulphonic acid and carboxylic acid groups, R represents hydrogen or a substituted or unsubstituted lower alkyl radical or aralkyl radical, R' represents a substituted or unsubstituted lower alkyl radical, X represents a —CN or —SCN group and the benzene ring B may be further substituted by groups other than sulphonic and carboxylic acid groups, provided that when R represents a β-cyano-lower alkyl radical R' does not represent either a β-cyano- or a β-acyloxy-lower alkyl radical.

As examples of the substituents which may be present in the 1:4-phenylene or 1:4-naphthylene nucleus represented by A there may be mentioned lower alkyl, such as methyl, lower alkoxy such as methoxy, halogeno such as chloro and bromo, trifluoromethyl and acylamino such as acetylamino.

As examples of further substituents which may be present in the benzene nucleus B there may be mentioned lower alkyl, for example methyl, and halogeno for example chloro and bromo.

As an example of an aralkyl radical represented by R there may be mentioned benzyl.

As examples of radicals which may be represented by both R and R' there may be mentioned the lower alkyl radicals, methyl, ethyl, propyl and butyl and especially there may be mentioned substituted lower alkyl radicals, for example hydroxy lower alkyl radicals such as hydroxyethyl, hydroxypropyl, hydroxybutyl, lower alkoxy-lower alkyl radicals such as ethoxyethyl, methoxyethyl, methoxypropyl, methoxybutyl, cyano-lower alkyl radicals such as cyanomethyl, cyanoethyl, cyanopropyl, cyanobutyl, acyloxy-lower alkyl radicals such as acetoxyethyl, acetoxypropyl, acetoxybutyl, propionoxyethyl, halogeno-lower alkyl radicals such as chloroethyl, bromoethyl, carbo-lower alkoxy-lower alkyl radicals such as carbethoxymethyl, carbomethoxyethyl, carbethoxyethyl, carbomethoxymethyl, lower alkylsulphonyl-lower alkyl radicals such as methylsulphonylethyl, ethylsulphonylethyl, lower alkylcarbonyl radicals such as methylcarbonylethyl, ethylcarbonylethyl, and various other substituted lower alkyl radicals such as aminocarbonylethyl, dihydroxypropyl, γ-chloro-β-hydroxypropyl, γ-bromo-β-hydroxypropyl, β:γ-epoxypropyl, and β-(4:6-diamino-s-triazin-2-yl)ethyl.

According to a further feature of the invention there is provided a process for the manufacture of the new water-insoluble azo dyestuffs, as hereinbefore defined, which comprises coupling a diazotised amine of the formula:

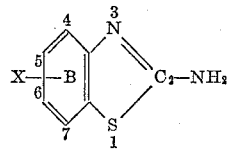

wherein B and X have the meanings stated above, with a coupling component of the formula:

$$H-A-N{\overset{R}{\underset{R'}{}}}$$

wherein A, R and R' have the meanings stated above.

The process of the invention may be conveniently brought about by adding the amine to a solution of nitrosylsulphuric acid, adding the diazo solution so obtained to a solution of the coupling component in an aqueous solution of hydrochloric acid, adding sodium hydroxide and filtering off the azo dyestuff which is precipitated.

Those amines used in the process of the invention wherein X represents a —CN group may be obtained by treating the appropriate aminobenzonitrile with thiophosgene, reacting the isothiocyanate so obtained with ammonia and finally treating the thiourea so obtained with a solution of bromine in chloroform.

Those amines used in the process of the invention wherein X represents a —SCN group may be obtained by treating the appropriate aminothiocyanobenzene with a thiocyanate, for example sodium or ammonium thiocyanate and subsequently treating with chlorine or bromine, or by treating the appropriate aminothiocyanobenzene with thiophosgene, then with ammonia and finally treating with bromine.

As specific examples of amines which may be used in the process of the invention there may be mentioned 2-amino-6-thiocyanobenzthiazole,
2-amino-6-cyanobenzthiazole,
2-amino-4-chloro-6-cyanobenzthiazole,
2-amino-4-bromo-6-cyanobenzthiazole,
2-amino-4-methyl-6-thiocyanobenzthiazole,
2-amino-4-ethyl-6-thiocyanobenzthiazole,
2-amino-6-methyl-4-thiocyanobenzthiazole,
2-amino-4-chloro-6-thiocyanobenzthiazole and
2-amino-4-bromo-6-thiocyanobenzthiazole.

As examples of coupling components which may be used in the process of the invention there may be mentioned N:N-bis(β-acetoxyethyl)-m-toluidine,
N:N-bis(β-hydroxyethyl)aniline,
N-β-cyanoethyl-N-β'-hydroxyethyl-m-toluidine,
1-N-β-hydroxyethylnaphthylamine,
N-β-cyanoethyl-N-β'-hydroxyethylaniline,
N:N-bis-(β-chloroethyl-)aniline,
N:N-bis-(β-carbethoxymethyl-)aniline,
N:N-bis-(β-carbethoxyethyl-)aniline,
N:N-bis-(β-carbethoxyethyl-)m-toluidine,
N:N-bis-(β-methylsulphonylethyl-)aniline,
N:N-bis-(β-methylcarbonylethyl-)m-toluidine,
N:N-bis-(γ-chloro-β-hydroxypropyl-)aniline,
N:N-bis-(γ-bromo-β-hydroxypropyl-)aniline, N:N-bis-(β-γ-epoxypropyl-)m-toluidine,
N-ethyl-N-(β-hydroxyethyl-)aniline,
N-n-butyl-N-β-cyanoethyl-m-toluidine,
N-β-cyanoethyl-N-β'-methoxyethyl-m-toluidine,
N-β-acetoxyethyl-N-β'-carbethoxyethylaniline,
N-γ-chloro-β-hydroxypropyl - N - β'-hydroxyethyl-m-toluidine,
N-β-carbomethoxyethyl-N-β'-cyanotheyl-m-toluidine,
N-ethyl-N-β-methylsulphonylethylaniline,
N-β-carbomethoxyethyl-N-ethylaniline,
N-β-acetoxyethyl-N-β'-methylcarbonylethyl-m-toluidine,
N-β-aminocarbonylethyl-N-ethylaniline,
N-β-γ-dihydroxypropyl-N-ethylaniline,
N-cyclohexyl-N-β-hydroxyethylaniline,
N-benzyl-N-β-hydroxyethylaniline,
N:N-bis-(β-carbomethoxyethyl-)-m-chloroaniline,
N:N-bis-(β-acetoxyethyl-)-m-trifluoromethylaniline,
N:N-bis-(β-acetoxyethyl-)-m-acetylaminoaniline,
N-β-cyanoethyl-1-naphthylamine,
N-γ-chloro-β-hydroxypropyl-1-naphthylamine,
1-[N:N-bis-(β-hydroxyethyl-)amino]-3-acetamido-6-methoxybenzene,
1-[N-β-hydroxyethylamino]-2-methoxy-5-methylbenzene and
1-[N-β-hydroxyethylamino]-5-hydroxy-naphthalene.

The new water-insoluble azo dyestuffs, as hereinbefore defined, are valuable for dyeing textile materials comprising artificial fibres, for example cellulose ester fibres such as cellulose acetate rayon and cellulose triacetate rayon, polyamide fibres such as fibres from polyhexamethylene-adipamide and the polymer from caprolactam, polyvinyl fibres such as polyacrylonitrile fibres and modified polyacrylonitrile fibres, and aromatic polyester fibres such as polyethyleneterephthalate fibres. For dyeing such textile materials it is preferred to use the new azo dyestuffs in a finely dispersed form which may be obtained by milling the azo dyestuffs with water in the presence of a dispersing agent, for example the sodium salt of the condensation product of formaldehyde and naphthalene-β-sulphonic acid. If desired the dispersed aqueous paste of the dyestuff so obtained may be dried to form a re-dispersible powder which may be obtained in a non-dusting form by any of the processes known for forming non-dusting powders.

The new azo dyestuffs, as hereinbefore defined, have excellent affinity for artificial textile materials which they dye in orange to greenish-blue shades possessing excellent fastness to light, washing and to dry heat treatments.

The dyestuffs as hereinbefore defined wherein the substituent X occupies the 6-position of the benzthiazole nucleus and wherein the benzene nucleus B is not further substituted or is further substituted only by halogen (for example chlorine) are of great value because of their especially high affinity for artificial textile materials. The dyestuffs as hereinbefore defined wherein at least one of the radicals R and R' is a substituted lower alkyl radical have especially high light fastness.

We have further found that the dyestuffs wherein one of the radicals R and R' is a β-cyanoethyl radical or at least one of the radicals R and R' is a β-carbo-lower alkoxy-ethyl radical (for example a β-carbethoxyethyl radical) are of particular value in the dyeing of polyethylene terephthalate fibres. Dyestuffs in which R and R' represent β-carbo-lower alkoxy-ethyl radicals or β-acyloxy-ethyl radicals wherein the acyl group is derived from a lower alkyl carboxylic acid (for example a β-acetoxyethyl radical) are of particular value in the dyeing of cellulose acetate fibres.

British Patent No. 440,113 describes and claims a process for the manufacture of azo dyestuffs by coupling a diazotised 2-aminothiazole compound with an amine coupling in p-position to the amino group.

British Patent No. 787,369 describes and claims inter alia a process for the production of water-soluble azo dyestuffs in which the azo dyestuff forms the cation characterised by alkylating monoazo dyestuffs having no acid dissociating salt forming groups, of the general formula:

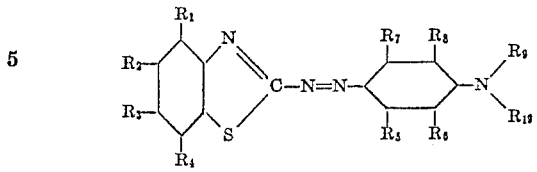

wherein $R_1$ to $R_8$ represent hydrogen or substituents which do not dissociate acid in neutral water, $R_9$ and $R_{10}$ represent hydrogen, aliphatic, araliphatic, heterocyclic-aliphatic, cyclo-aliphatic or aromatic substituents, wherein two neighbouring substituents R can form a ring with the condition that of $R_1$ to $R_8$ at least one R represents a substituent which does not dissociate acid in neutral water or that at least $R_9$ or $R_{10}$ represents a substituent with more than one carbon atom. Neither of these two specifications describes the azo dyestuffs which are described in the present application. Compared with the nearest related dyestuffs described in British Patent No. 787,369 the dyestuffs of the present application are superior in respect of their affinity for textile materials comprising cellulose acetate rayon and aromatic polyester fibres.

The invention is illustrated but not limited by the following examples in which the parts and percentages are by weight:

*Example 1*

1.4 parts of sodium nitrite are added, with stirring, to 22 parts of sulphuric acid at a temperature between 20° and 27° C. during 30 minutes and the solution so obtained is stirred for a further 15 minutes. The solution is then added with stirring to a suspension of 4.14 parts of 2-amino-6-thiocyano-benzthiazole in 34 parts of an 85% aqueous solution of sulphuric acid, at a temperature of —3° C. 40 parts of water are then added and the mixture is stirred at 0° C. for 5 minutes. The diazo solution so obtained is then added to a solution of 5.58 parts of N:N-bis-(β-acetoxyethyl-)m-toluidine in a mixture of 100 parts of water, 10 parts of a 2 N aqueous solution of hydrochloric acid and 50 parts of acetone at a temperature of 5° C. 50 parts of a 40% aqueous solution of sodium hydroxide solution are then added, the mixture stirred for 30 minutes and the precipitated dyestuff filtered off. The dyestuff paste is stirred with 300 parts of water, sodium carbonate is added until the mixture is neutral to litmus and the precipitated dyestuff is then filtered off, washed with water and dried. When dispersed in aqueous medium the dyestuff dyes cellulose acetate, polyamide and aromatic polyester textile materials in bluish-red shades possessing good fastness to light. The dyeings on aromatic polyester textile materials possess excellent fastness to dry heat treatments.

*Example 2*

In place of the 5.58 parts of N:N-bis-(β-acetoxyethyl-)-m-toluidine used in Example 1 there are used 5.86 parts of N:N-bis-(β-carbethoxyethyl)aniline. The dyestuff so obtained, when dispersed in aqueous medium, dyes aromatic polyester textile materials in red shades possessing excellent fastness to light and to dry heat treatments.

*Example 3*

In place of the 5.58 parts of N:N-bis(β-acetoxyethyl)-m-toluidine used in Example 1 there are used 4.14 parts of N-β-cyanoethyl-N-β'-hydroxyethyl-m-toluidine. The dyestuff so obtained, when dispersed in aqueous medium, dyes cellulose acetate and polyamide textile materials and aromatic polyester textile materials in bluish-red shades possessing excellent fastness to dry heat treatments.

*Example 4*

In place of the 5.58 parts of N:N-bis-(β-acetoxyethyl-)-m-toluidine used in Example 1 there are used 4.36 parts of N-β-cyanoethyl-N-β-methoxyethyl-m-toluidine. The product so obtained is (6-thiocyanobenzthiazol-2-yl)-azo-(2-methyl-4-N-β-cyanoethyl-N-β-methoxyethylaminobenzene). When dispersed in aqueous medium it dyes aromatic polyester textile materials in red shades possessing outstanding fastness to light and to dry heat treatments.

*Example 5*

In place of the 4.14 parts of 2-amino-6-thiocyanobenzthiazole used in Example 1 there are used 3.5 parts of 2-amino-6-cyanobenzthiazole and in place of the 5.58 parts of N:N-bis(β-acetoxyethyl-)m-toluidine there are used 4.36 parts of N-β-cyanoethyl-N-β-methoxyethyl-m-toluidine. The product so obtained is (6-cyanobenzthiazol-2-yl)azo-(2-methyl-4-N-β-cyanoethyl-N-β-methoxyethylaminobenzene) when dispersed in aqueous medium it dyes aromatic polyester textile materials in red shades possessing outstanding fastness to light and to dry-heat treatments.

*Example 6*

In place of the 4.14 parts of 2-amino-6-thiocyanobenzthiazole used in Example 1 there are used 4.42 parts of 2-amino-4-thiocyano-6-methylbenzthiazole and in place of the 5.58 parts of N:N-bis-(β-acetoxyethyl)-m-toluidine there are used 6.44 parts of N:N-bis-(β-acetoxyethyl)-m-aminoacetanilide. The dyestuff so obtained, when dispersed in aqueous medium, dyes cellulose acetate, cellulose triacetate and aromatic polyester materials in red shades and the dyeings obtained possess excellent fastness to dry heat treatments and good fastness to light.

*Example 7*

In place of the 4.14 parts of 2-amino-6-thiocyanobenzthiazole used in Example 1 there are used 4.84 parts of 2-amino-4-chloro-6-thiocyanobenzthiazole and in place of the 5.58 parts of N:N-bis-(β-acetoxyethyl)-m-toluidine there are used 4.36 parts of N-β-cyanoethyl-N-β'-methoxyethyl-m-toluidine. The dyestuff so obtained, when dispersed in aqueous medium, dyes cellulose acetate, cellulose triacetate and aromatic polyester textile materials in bluish red shades, possessing excellent fastness to dry heat treatments and good fastness to light.

The 2-amino-4-chloro-6-thiocyanobenzthiazole is obtained by treating an acetic acid solution of o-chloroaniline with 2 mol. equivs. of potassium thiocyanate and 1 mol. equiv. of bromine, buffering the resulting mixture with sodium acetate and treating with a further 2 mol. equivs. of potassium thiocyanate and 1 mol. equiv. of bromine. The mixture is poured into water and the 2-amino-4-chloro-6-thiocyanobenzthiazole is isolated from the precipitate by extraction with hot dilute acid and recrystallisation from butanol.

*Example 8*

In place of the 4.14 parts of 2-amino-6-thiocyanobenzthiazole used in Example 1 there are used 4.20 parts of 2-amino-4-chloro-6-cyanobenzthiazole and in place of the 5.58 parts of N:N-bis-(β-acetoxyethyl)-m-toluidine there are used 6.44 parts of N:N-bis-(β-acetoxyethyl)-m-aminoacetanilide. The dyestuff so obtained, when dispersed in aqueous medium, dyes cellulose acetate, cellulose triacetate and aromatic polyester materials in violet shades and the dyeings possess excellent fastness to dry heat treatments and good fastness to light.

The 2-amino-4-chloro-6-cyanobenzthiazole is obtained by treating a chloroform solution of 2-chloro-4-cyanoaniline with thiophosgene, treating the 2-chloro-4-cyanophenylisothiocyanate so produced with ammonia, and ring-closing the resulting N-(2-chloro-4-cyanophenyl)-thiourea by refluxing with bromine in chloroform.

The following table gives further examples of the shades obtained on aromatic polyester textile materials using the dyestuffs obtained by diazotising the amines listed in the second column of the table and coupling with the coupling components listed in the third column of the table by the method described in Example 1.

| Ex. | Amine | Coupling component | Shade on aromatic polyester textile material |
|---|---|---|---|
| 9 | 2-amino-6-cyanobenzthiazole. | N-β-cyanoethyl-N-β-hydroxyethylaniline. | Yellowish-red. |
| 10 | ----do---- | N-β-cyanoethyl-N-β-hydroxyethyl-m-toluidine. | Bluish-red. |
| 11 | ----do---- | N:N-bis-(β-acetoxyethyl)m-toluidine. | Do. |
| 12 | ----do---- | 3:5-dimethyl-N:N-bis(β-hydroxyethyl)aniline. | Red. |
| 13 | ----do---- | N:N-bis(β-carbethoxyethyl)aniline. | Red. |
| 14 | 2-amino-6-thiocyanobenzthiazole. | N-β-cyanoethyl-N-β-hydroxyethylaniline | Scarlet. |
| 15 | ----do---- | N-ethyl-N-β-carbomethoxyethylaniline. | Red. |
| 16 | 2-amino-6-thiocyanobenzthiazole. | N-n-butyl-N-β-cyanoethyl-m-toluidine. | Red. |
| 17 | ----do---- | N:N-bis-(β-carbethoxyethyl)-m-toluidine. | Red. |
| 18 | 2-amino-6-cyanobenzthiazole. | N-β-hydroxyethyl-N-β'-aminocarbonylethyl-m-toluidine. | Reddish violet. |
| 19 | ----do---- | N:N-bis-(β-aminocarbonylethyl)-m-toluidine. | Bluish red. |
| 20 | ----do---- | N-ethyl-N-β-aminocarbonylethylaniline. | Do. |
| 21 | ----do---- | N:N-dimethylaniline | Do. |
| 22 | ----do---- | N-n-butyl-N-β-cyanoethyl-m-toluidine | Do. |
| 23 | ----do---- | N:N-bis-(β-carbethoxyethyl)-m-toluidine. | Do. |
| 24 | ----do---- | N:N-bis-(β-methoxyethyl)-m-toluidine. | Do. |
| 25 | ----do---- | N:N-bis-(β-acetoxyethyl)-m-chloroaniline. | Red. |
| 26 | ----do---- | N-β-cyanoethyl-N-β'-carbethoxyethyl-m-toluidine. | Red. |
| 27 | ----do---- | N:N-bis-(β-acetoxyethyl)-m-trifluoromethylaniline. | Scarlet. |
| 28 | ----do---- | N:N-bis-(β-acetoxyethyl)-m-aminoacetanilide. | Reddish violet. |
| 29 | 2-amino-6-cyanobenzthiazole. | N-β-cyanoethyl-m-chloroaniline. | Orange. |
| 30 | ----do---- | N:N-bis-(carbomethoxymethyl)aniline. | Reddish orange. |
| 31 | ----do---- | N-cyanomethyl-N-β-carbomethoxyethylaniline. | Do. |
| 32 | ----do---- | N-β-cyanoethyl-N-β'-carbomethoxyethylaniline. | Red. |
| 33 | 2-amino-6-thiocyanobenzthiazole. | N:N-dimethylaniline | Bluish-red. |
| 34 | ----do---- | N:N-bis-(carbethoxymethyl)aniline. | Reddish-orange. |
| 35 | ----do---- | N-methyl-N-β-(4:6-diamino-s-triazin-2-yl)ethylaniline. | Red. |
| 36 | ----do---- | N:N-bis-(β-methoxyethyl)-m-toluidine. | Bluish red. |
| 37 | ----do---- | N:N-bis-(β-acetoxyethyl)-m-chloroaniline. | Red. |
| 38 | ----do---- | N-β-cyanomethyl-1-naphthylamine. | Reddish violet. |
| 39 | ----do---- | N:N-bis-(β-hydroxyethyl)-1-naphthylamine. | Violet-brown. |
| 40 | ----do---- | N-β-cyanoethyl-N-β'-carbethoxyethyl-m-toluidine. | Red. |
| 41 | ----do---- | N:N-bis-(β-acetoxyethyl)-1-naphthylamine. | Reddish-brown. |
| 42 | ----do---- | N:N-bis-(β-acetoxyethyl)-m-aminoacetanilide. | Bluish-red. |
| 43 | ----do---- | N:N-bis-(γ-chloro-β-hydroxy-n-propyl)-m-toluidine. | Do. |
| 44 | ----do---- | N:N-bis-(β-carbo-(β'-hydroxyethoxy)-ethyl)aniline. | Orange-brown. |
| 45 | ----do---- | N:N-bis-(β-acetoxyethyl)aniline. | Red. |
| 46 | ----do---- | N:N-bis-(β-acetoxyethyl)p-xylidine. | Orange-brown. |
| 47 | ----do---- | N-β-cyanoethyl-m-chloroaniline. | Orange. |

| Ex. | Amine | Coupling component | Shade on aromatic polyester textile material |
|---|---|---|---|
| 48 | ___do___ | N:N-bis-(carbomethoxymethyl)aniline. | Reddish-orange. |
| 49 | ___do___ | N-cyanomethyl-N-β-carbomethoxyethylaniline. | Do. |
| 50 | ___do___ | N-β-cyanoethylaniline. | Orange-brown. |
| 51 | ___do___ | N-β-cyanoethyl-N-β'-carbomethoxyethylaniline. | Scarlet. |
| 52 | 2-amino-6-cyanobenzthiazole. | N-β-cyanoethylaniline. | Orange-brown. |
| 53 | 2-amino-4-thiocyano-6-methylbenzthiazole. | N:N-bis-(β-acetoxyethyl)-m-toluidine. | Red. |
| 54 | ___do___ | N:N-bis-(Carbomethoxyethyl)aniline. | Red. |
| 55 | 2-amino-4-chloro-6-thiocyanobenzthiazole. | N:N-bis-(β-acetoxyethyl)-m-aminoacetanilide. | Violet. |
| 56 | 2-amino-4-chloro-6-cyanobenzthiazole. | N:N-bis-(β-carbomethoxyethyl)aniline. | Bluish-red. |
| 57 | 2-amino-6-cyanobenzthiazole. | N:N-bis-(β-carbomethoxyethyl)-m-aminoacetanilide. | Rubine. |
| 58 | 2-amino-6-thiocyanobenzthiazole. | N-ethyl-N-(3'β-chloroethylaminosulphonylbenzyl)aniline. | Red. |

What we claim is:

1. Water-insoluble azo dyestuffs of the formula:

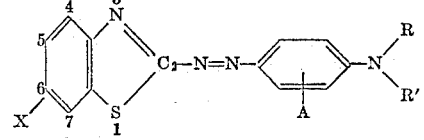

wherein X is a radical selected from the class consisting of —SCN and —CN; A represents a lower alkyl group; R represents a lower alkoxy-lower alkyl group; and R' represents a cyano-lower alkyl group.

2. (6-thiocyanobenzthiazol-2-yl)-azo-(2-methyl-4-N-β-cyanoethyl-N-β-methoxyethylaminobenzene).

3. (6 - cyanobenzthiazol - 2-yl)azo-(2-methyl-4-N-β-cyanoethyl-N-β-methoxyethylaminobenzene).

References Cited in the file of this patent

UNITED STATES PATENTS

| | | |
|---|---|---|
| 2,683,709 | Dickey et al. | July 13, 1954 |
| 2,730,523 | Dickey et al. | Jan. 10, 1956 |
| 2,785,157 | Straley et al. | Mar. 12, 1957 |
| 2,832,764 | Huenig | Apr. 29, 1958 |
| 2,980,666 | Merian et al. | Apr. 18, 1961 |